US005317071A

United States Patent [19]

Honeycutt

[11] Patent Number: 5,317,071

[45] Date of Patent: May 31, 1994

[54] ALDEHYDE TREATMENT SYSTEM

[75] Inventor: Travis W. Honeycutt, Gainesville, Ga.

[73] Assignee: Isolyser Company, Inc., Norcross, Ga.

[21] Appl. No.: 649,763

[22] Filed: Jan. 31, 1991

[51] Int. Cl.[5] .................... B65D 85/24; C08G 16/00

[52] U.S. Cl. .................................... 527/305; 527/300; 527/301; 527/309; 428/34.1; 206/366; 536/18.7; 210/633; 210/634; 210/729; 210/730; 210/731; 210/733; 210/734; 210/735; 210/749; 210/751; 210/908

[58] Field of Search ............... 210/908, 633, 634, 729, 210/730, 731, 733, 734, 735, 749, 751; 428/34.1; 206/366; 536/18.7; 527/305, 300, 301, 309

[56] References Cited

U.S. PATENT DOCUMENTS

| | | | |
|---|---|---|---|
| 4,816,307 | 3/1989 | Honeycutt | 428/34.1 |
| 4,900,500 | 2/1990 | Honeycutt | 428/34.1 |
| 4,960,594 | 10/1990 | Honeycutt | 424/445 |

*Primary Examiner*—Johnnie R. Brown
*Assistant Examiner*—Elli Peselev
*Attorney, Agent, or Firm*—Malcolm B. Wittenberg

[57] ABSTRACT

A method of converting a toxic composition containing an aldehyde to a composition which is substantially non-toxic. The aldehyde is reacted with a compound having protic oxygen or nitrogen atoms and a polyimine or polyimine derivative to absorb or swell the aldehyde-containing composition and preferably to yield a substantially solid reaction product by way of a substantially irreversible reaction.

8 Claims, No Drawings

ALDEHYDE TREATMENT SYSTEM

TECHNICAL FIELD OF INVENTION

The present invention deals with a method of converting a toxic composition containing an aldehyde such as formaldehyde or glutaraldehyde to a composition which is substantially non-toxic. The reaction yields a substantially solid reaction product by way of a substantially irreversible reaction.

BACKGROUND OF THE INVENTION

Aldehydes, particularly formaldehyde and glutaraldehyde, are classical disinfectants, sterilizing and preserving agents used since the 18th Century. Formaldehyde is used by health care institutions for preserving tissue and by industry for various manufacturing processes including paper manufacture. Formaldehyde is also used in the funeral home business for embalming, and for disinfecting the surrounding work area. Formaldehyde, also referred to as "formalin," is sold to these institutions both in a concentrated form (37 to 50% formaldehyde, 6 to 15% alcohol stabilizer, and water) and, in dilution, the most common concentration being 10% formalin or 3.75% formaldehyde.

Glutaraldehydes are sold to hospitals and laboratories as cold sterilant solutions. The major difference between glutaraldehyde and formaldehyde is that each molecule of glutaraldehyde has two active protons while formaldehyde has one and is of a lower molecular weight. Glutaraldehyde and formaldehyde are the only chemicals approved by the EPA for sterilizing surgical instruments, endoscopic equipment, arthroscopic instruments, cameras, and similar apparatus. Glutaraldehydes are also used to sterilize surgical instruments and treatment supplies that may be damaged by other sterilizing methods, including autoclaving and ETO (ethylene oxide).

The use of aldehydes is extensive. There are millions of gallons of waste water disposed of each year that are contaminated by "aldehyde" solutions. Aldehydes are classified as acutely-toxic by the EPA. Their use and disposal are now heavily regulated by both the Occupational Safety and Health Agency (OSHA), the Environmental Protection Agency (EPA) as well as various state, county and city health and environmental resource departments.

Aldehydes are particularly useful in pathological, biological, micro-biological and dissecting laboratories because of their quick, effective kill of all pathogenic organisms. However, aldehydes, with their carbonyl group and active proton, have recently been determined to be mammalian carcinogens. Increasing concern for worker exposure and concern for the environment have initiated the development of new handling, storage, and disposal regulations to limit worker and public exposure. The OSHA defined exposure limit for formaldehydes is 0.70 ppm. Beyond this level a respirator must be used while concentrations above this level are considered carcinogenic, even though at this low level of concentration, formaldehyde may not be generally detectable to the sense of smell. Clearly, if the aldehyde can be smelled, the concentration probably exceeds OSHA safety standards.

The risks associated with handling aldehydes begins for the user with the storage of the concentrate after arrival at the purchaser's facility. It continues when the concentrate is diluted for use in for example, the laboratory, operating room, emergency room and morgue and, finally, when the contaminated "waste water" is collected at the point-of-use. Health risks for workers continue as the used material, typically 10% formalin (3.75% formaldehyde), is transported to designated storage areas, or when poured down the drain into waste water treatment systems. Disposal into the sewage treatment system is no longer permitted under the EPA Clean Water Regulations dated Jul 24, 1990.

All pollutants and pesticides are considered to be a threat to desirable microbes that are needed to break down waste materials in the waste water treatment process. The new regulations are designed to prevent the waste generator from entering toxic materials into the waste waster treatment system. They give the EPA authority to monitor waste water at the generation site versus, as practiced in the past, by monitoring treated waste water after it has been through the public owned waste water treatment system. Hospitals, laboratories, funeral homes and industry are now held to a much higher standard of control and compliance. The liability exposure is considerable to violators, both to their reputations in the community and to the possibility of substantial fines for each violation.

The highest levels of formalin sold for cold sterilization and for preserving tissue, ranges from 37 to 50% formaldehyde. Concentrations in this range must be incinerated in a licensed toxic waste incinerator that is designed to handle liquids. There are but two such facilities in the United States. One in Illinois and the other in Texas. Lower concentrations of formaldehyde must be handled in the same way if the waste remains in a liquid state. However, most hazardous and toxic waste contractors pour the contaminated waste water into absorbents, such as vermiculite, to convert this into a "solid," thereby making it possible to burn the material in the more numerous solid hazardous waste incinerators.

As there has become increasing concern for worker exposure as well as concern for the environment generally, various methods, techniques and products have been sought to control exposure to the potential carcinogenic properties of aldehydes. However, to date, there has not been a suitable teaching of any protocol to remove aldehydes such as formaldehyde and glutaraldehyde from waste streams after their disinfecting properties have been taken advantage of.

It is thus an object of the present invention to provide a method of removing aldehydes such as formaldehyde and glutaraldehyde from a composition containing such compounds to provide a substantially non-toxic composition which can be dealt with in a reasonable fashion.

It is yet a further object of the present invention to convert a toxic composition containing an aldehyde such as formaldehyde or glutaraldehyde to produce a non-toxic composition by a substantially irreversible reaction.

These and further objects will be more readily appreciated when considering the following disclosure and appended claims.

SUMMARY OF THE INVENTION

The present invention involves a method of converting a toxic composition containing an aldehyde to a composition which is substantially non-toxic, the method comprising reacting the aldehydes with a polymer having protic oxygen or nitrogen atoms and a polyimine or polyimine derivative to substantially swell or absorb and preferably form a solid reaction product by way of a substantially irreversible reaction.

DETAILED DESCRIPTION OF THE INVENTION

As previously noted, the present invention involves a substantial reduction of toxicity of a waste stream containing aldehydes such as formaldehyde and glutaraldehyde by irreversibly reacting these aldehydes to produce substantially non-toxic bi-products. It is contemplated that the aldehydes be irreversibly reacted with one or more polymers having protic oxygen or nitrogen atoms in the presence of a polyimine or polyimine derivative that will not present a hazardous waste to the environment and at the same time, solidify to a solid mass. In doing so, the liquid aldehyde waste stream is absorbed or swelled or preferably solidified and which can be disposed of as solid waste rather than as a liquid, the later being much more difficult to deal with and, as a result, is much more highly regulated.

Typically, aldehyde waste streams contain approximately 3.75% formaldehyde or less. Preferably, these waste streams are reacted with 1-1.5 equivalents of a polymer having protic oxygen or nitrogen atoms which can be in the form of, for example, polyacrylamide, or cellulose, starch or sugar polymers. The polymer is blended with a molar equivalent of a polyimine, such as, for example, BASF POLYMIN TM G-20, G-35 or P. The polyimine may be protonated with acetic acid or formic acid.

Although not wishing to be bound by any particular reaction theory, it is believed that the formaldehyde adds autocatalytically to the polymer having protic oxygen or nitrogen atoms in the presence of a catalyst forming methylol groups. The catalyst can be a protonated primary, secondary or tertiary amine in the polyimine chain forming an ether. This is an irreversible reaction which effectively removes the aldehydes from the waste stream so they no longer have an opportunity to contaminate the environment. The only liquid biproduct of this reaction is water which, of course, is not an environmental hazard.

The polymer having protic oxygen atoms can comprise, for example cellulose substituted cellulose, starch, substituted starch, sugar polymers and their derivatives. Cellulose is used as a generic term to encompass such species as ethyl hydroxyethyl cellulose, hydroxypropyl cellulose and ethyl cellulose. The polymer having protic nitrogen atoms can comprise, for example, polyacrylamide having repeating units

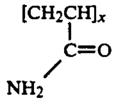

which is available from PPG sold under its trademark Mazorb TM 5003A. With formaldehyde, it forms $R—NH—CH_2OH$ or a methylol adduct. It was found that one part of a mixture of 90% by weight polyacrylamide- when combined with 10% by weight polyimine

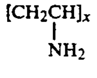

added to 30 parts waste water containing 3.75% formaldehyde completely removes the formaldehyde as a solid reaction product.

The polyimine component can be the polymerization product of any alkyl or aryl amine and preferably a complex mixture of primary, secondary and tertiary amines.

By employing a primary amine and formaldehyde as the principal reactants as well as cellulose, it is believed that the reaction which takes place in practicing the present method is as follows:

$$R^1—C_2H_4—NH_2+H_2C{=}O \rightarrow R^1—C_2H_4—N{=}CH_2+H_2O \text{ or}$$

$$R^1—C_2H_4—NH_2+H_2C{=}O \rightarrow R^1—C_2H_4—NH—CH_2—OH$$

$$R^1—C_2H_4—NH—CH_2—OH+\text{Cell}—OH \rightarrow \text{Cell}—O—CH_2—NH—C_2H_4—R^1+H_2O$$

EXAMPLE I

Approximately 2.5 g of the polyacrylamide Mazorb TM 5003A was mixed with approximately 0.5 g of the polyimine Polymin TM G-35 and approximately 0.1 g of Polymin TM SNA 60. To this mix was added 100 g of 10% formalin with shaking. The liquid was completely absorbed in 30 minutes forming a granular solid 24 hours later. A TCLP extraction followed by spectrophotometric analysis demonstrated that 99.6% removal of the formaldehyde had taken place. What remained was well below acceptable toxic levels.

EXAMPLE II

Approximately 11 g of ethyl hydroxyethyl cellulose sold as Berol Novel Bermocelle 411G was mixed with approximately 7.5 g of the polyimine Polymin TM G-35. This was further mixed with 20 g isopropyl alcohol to form a slurry. To this was added 200 g of 10% formalin which is equivalent to 3.75% formaldehyde by weight in water. Samples were allowed to set for 48 hours and were subjected to TCLP extraction followed by spectrophotometric analysis. No formaldehyde was detected in the sample.

I claim:

1. A method of converting a toxic composition containing an aldehyde to a composition which is substantially non-toxic, said method comprising reacting said aldehyde with one or more polymers having protic oxygen or nitrogen atoms and a polyimine to substantially swell or absorb to form a substantially solid reaction product by way of a substantially irreversible reaction, said polymers being a member selected from the group consisting of polyacrylamide, cellulose, ethyl hydroxyethyl cellulose, hydroxypropyl cellulose, ethyl cellulose, starch and sugar polymers.

2. The method of claim 1 wherein said polymers having oxygen atoms are selected from the group consisting of cellulose, starch and sugar polymers.

3. The method of claim 1 wherein said polyimine and a member selected from the group consisting of a primary, secondary and tertiary amine containing polymers.

4. The method of claim 3 wherein said primary secondary or tertiary amine is protonated with a member selected from the group consisting of acetic and formic acid.

5. The method of claim 1 wherein said aldehyde is formaldehyde.

6. The method of claim 1 wherein said aldehyde is glutaraldehyde.

7. A method of converting a toxic composition containing formaldehyde or glutaraldehyde to a composition which is substantially non-toxic, said method comprising reacting said formaldehyde or glutaraldehyde with approximately 1–1.5 equivalents of one or more polymers having protic oxygen or nitrogen atoms having been blended with a molar equivalent of a polyimine based upon the weight of the formaldehyde or glutaraldehyde in solution, said polymers being a member selected from the group consisting of polyacrylamide, cellulose, ethyl hydroxyethyl cellulose, hydroxypropyl cellulose, ethyl cellulose, starch and sugar polymers.

8. The method of claim 7 wherein said formaldehyde or glutaraldehyde is contained in a waste stream at concentrations of approximately 3.75% or less.

* * * * *